(12) United States Patent
Ostaszewski

(10) Patent No.: US 10,598,924 B2
(45) Date of Patent: Mar. 24, 2020

(54) CROSS FLEXURE SUSPENSION SYSTEM

(71) Applicant: Ball Aerospace & Technologies Corp., Boulder, CO (US)

(72) Inventor: Miroslaw A. Ostaszewski, Louisville, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 15/861,372

(22) Filed: Jan. 3, 2018

(65) Prior Publication Data

US 2018/0196257 A1 Jul. 12, 2018

Related U.S. Application Data

(60) Provisional application No. 62/442,068, filed on Jan. 4, 2017.

(51) Int. Cl.
*F16M 11/10* (2006.01)
*G02B 26/10* (2006.01)
(Continued)

(52) U.S. Cl.
CPC ............. *G02B 26/101* (2013.01); *A47G 1/02* (2013.01); *A47G 1/24* (2013.01); *F16F 15/04* (2013.01);
(Continued)

(58) Field of Classification Search
USPC ....... 248/466, 476, 479, 481, 484, 485, 486, 248/487; 359/872, 873, 874, 876, 877,
(Continued)

(56) References Cited

U.S. PATENT DOCUMENTS 3,181,851 A 5/1965 Troeger
3,181,918 A 5/1965 Troeger
(Continued)

FOREIGN PATENT DOCUMENTS

EP 0348845 1/1990
EP 1887398 2/2008

OTHER PUBLICATIONS

Markovic et al. "Characterization of cross-spring pivots for micropositioning applications," Proceedings of SPIE, Smart Sensors, Actuators, and MEMS VII; and Cyber Physical Systems, May 2015, vol. 9517, 951727, 8 pages.
(Continued)

*Primary Examiner* — Alfred J Wujciak
(74) *Attorney, Agent, or Firm* — Sheridan Ross P.C.

(57) ABSTRACT

Suspension system structures and methods are provided. A system as disclosed allows for rotation of a supported object in two axes, with very little translational movement of the supported object. The system can include a base mounting structure that is joined to an intermediate or connecting structure by a first set of flexure blades. The connecting structure is in turn joined to a supported element structure by a second set of flexure blades. The first set of flexure blades can include four blades that intersect along a line that is coincident with an X axis of rotation, and the second set of flexure blades can include four blades that intersect along a line that is coincident with the Y axis of rotation. The components of the suspension system can comprise a monolithic structure that is formed from a single piece of material.

20 Claims, 7 Drawing Sheets

(51) Int. Cl.
  *A47G 1/24* (2006.01)
  *A47G 1/02* (2006.01)
  *G02B 26/08* (2006.01)
  *F16F 15/04* (2006.01)
  *F16M 11/20* (2006.01)
  *G02B 7/182* (2006.01)

(52) U.S. Cl.
  CPC ......... *F16M 11/10* (2013.01); *F16M 11/2021* (2013.01); *G02B 7/1821* (2013.01); *G02B 26/0816* (2013.01)

(58) Field of Classification Search
  USPC .......................................... 359/879, 880, 881
  See application file for complete search history.

(56) References Cited

U.S. PATENT DOCUMENTS

| | | | |
|---|---|---|---|
| 3,252,696 A | 5/1966 | Friedel | |
| 3,465,997 A * | 9/1969 | Piske | F16C 11/12 |
| | | | 248/619 |
| 3,807,029 A | 4/1974 | Troeger | |
| 3,811,665 A | 5/1974 | Seelig | |
| 3,813,089 A | 5/1974 | Troeger | |
| 3,825,992 A | 7/1974 | Troeger | |
| 4,261,211 A | 4/1981 | Haberland | |
| 4,327,527 A | 5/1982 | Seelig et al. | |
| 4,533,100 A | 8/1985 | Paseri | |
| 4,678,295 A * | 7/1987 | Fisher | B60R 1/072 |
| | | | 248/481 |
| 4,770,522 A * | 9/1988 | Alten | B60R 1/072 |
| | | | 248/485 |
| 4,802,720 A | 2/1989 | Paulsen | |
| 4,802,784 A | 2/1989 | Brooks | |
| 4,812,072 A | 3/1989 | Brooks | |
| 4,825,713 A | 5/1989 | Wilkey | |
| 4,919,382 A * | 4/1990 | Forman | B25J 17/0266 |
| | | | 248/178.1 |
| 4,997,123 A | 3/1991 | Backus et al. | |
| 5,283,682 A | 2/1994 | Ostaszewski | |
| 5,521,740 A | 5/1996 | Brosens | |
| 5,529,277 A | 6/1996 | Ostaszewski | |
| 5,620,169 A | 4/1997 | Payne | |
| 5,703,732 A * | 12/1997 | Boddy | B60R 1/074 |
| | | | 359/841 |
| 6,972,885 B2 * | 12/2005 | Hiley | G02B 7/182 |
| | | | 248/479 |
| 7,354,170 B2 * | 4/2008 | Ishikawa | B60R 1/072 |
| | | | 248/487 |
| 9,354,422 B1 | 5/2016 | Quakenbush | |
| 9,612,436 B1 | 4/2017 | Hoffman et al. | |
| 2010/0208322 A1 * | 8/2010 | Borchers | G02B 26/085 |
| | | | 359/223.1 |
| 2014/0208848 A1 * | 7/2014 | Krylov | B81B 3/0048 |
| | | | 73/504.12 |

OTHER PUBLICATIONS

Invitation to Pay Additional Fees for International (PCT) Patent Application No. PCT/US2018/012178, dated Jun. 18, 2018 18 pages.
International Search Report and Written Opinion for International (PCT) Patent Application No. PCT/US2018/012178, dated Aug. 20, 2018 21 pages.
International Preliminary Report on Patentability for International (PCT) Patent Application No. PCT/US2018/012178, dated Jul. 18, 2019 14 pages.

* cited by examiner

CROSS FLEXURE SUSPENSION SYSTEM

CROSS-REFERENCE TO RELATED APPLICATIONS

This application claims the benefit of U.S. Provisional Patent Application Ser. No. 62/442,068, filed Jan. 4, 2017, the entire disclosure of which is hereby incorporated herein by reference.

FIELD

The present disclosure provides a flexure or suspension system for supporting objects, such as mirrors, that allows for rotation about two perpendicular axes while minimizing translational movement.

BACKGROUND

It is a problem in the area of suspension systems to provide a flexible support structure having two degrees of freedom of rotation about a desired point while minimizing any translational movement of the object being supported. Optical scanning systems are a typical example of a type of system which requires a flexible suspension system having a high scanning frequency. In scanning systems that use a mirror to rapidly scan back and forth across an angular excursion, suspension component friction must be kept to a minimum in order to permit a high scanning frequency. It is also desirable to provide rotational freedom about two orthogonal axes while minimizing translational movement of the mirror or other supported object.

Suspension systems for supporting fast steering mirrors have been developed that provide two degrees of rotational freedom. For example, U.S. Pat. No. 5,529,277, assigned to Ball Corporation, provides a suspension system that utilizes two perpendicular four-bar linkages coupled by a common plate to provide a translational-free flexible suspension having two rotational degrees of freedom about a desired point. One of the four-bar linkages is secured to a stationary "ground" structure, and the other is attached to the object to be supported, such as a mirror. In one embodiment, two links of each of the two four-bar linkages are constructed from spring steel flexure elements that are rigid in all directions except about the rotation axis. The flexure elements thus comprise "revolute joints". Because the flexure elements function as spring hinges, no friction is encountered when the suspension is displaced or pivoted.

Scanning systems that use a mirror to rapidly scan back and forth across an angular excursion require that friction be kept to a minimum in order to permit a high scanning frequency. It is also desirable to provide rotational freedom about two orthogonal axes while minimizing translational movement of the mirror or other supported object. Prior suspension systems satisfy one or more of these requirements, but no prior system provides all of the features of the present system.

SUMMARY

Embodiments of the present disclosure provide suspension systems, also referred to herein as cross flexure suspension systems, for supporting objects, for example mirrors, to be rotated or oscillated about two perpendicular axes, while restricting translational movement in all other directions. Specifically, a compact, two axis degree of freedom (DOF) suspension system is presented. The suspension system can be used as a steering mirror suspension that allows relative large angular tip-tilt motions while constraining all other degrees of freedom. The suspension system can be provided as a monolithic flexure, and can be made by an Electrical Discharge Machining (EDM) process, allowing manufacturing of thin flexure blades while eliminating the need for welded or brazed joints.

In accordance embodiments of the present disclosure, the suspension system includes a base mounting structure that is joined to a connecting structure by a first set of flexure blades included in a first flexure structure that define a first axis of rotation. The connecting structure is in turn connected to a component mounting structure by a second set of flexure blades included in a second flexure structure that define a second axis of rotation. The first and second axes of rotation can be orthogonal to one another. In at least some embodiments, more than one set of flexure blades permitting rotation about one of the axes can be included in a respective flexure structure.

In accordance with further embodiments of the present disclosure, the cross flexure suspension system provides a two degree of freedom fast steering mirror suspension that allows a relatively large angular travel (more than +/−10°) with minimum decenter. The cross flexure suspension system is a compact flexure that can be included in a fast steering mirror assembly to provide a steering mirror suspension allowing large angular tip-tilt motions while constraining all other degrees of freedom and while allowing for a relatively high frequency of operation.

Additional features and advantages of embodiments of the present disclosure will become more readily apparent from the following description, particularly when taken together with the accompanying drawings.

DETAILED DESCRIPTION

Figure 1:
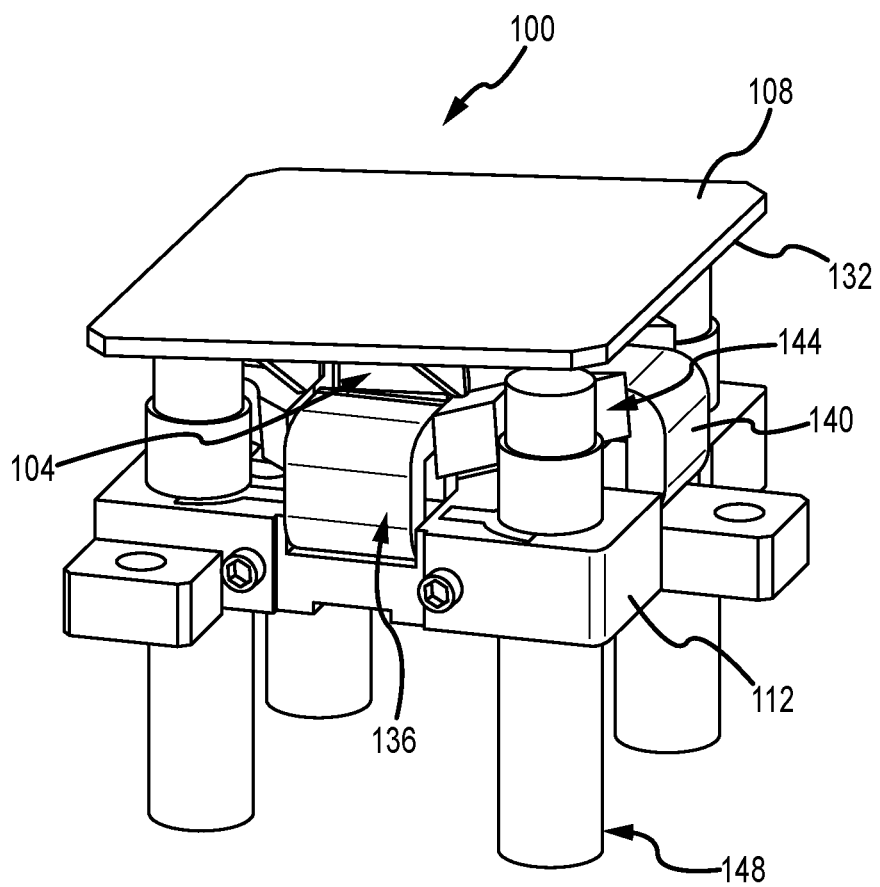
FIG. 1 is a perspective view of a fast steering mirror assembly incorporating a suspension system in accordance with embodiments of the present disclosure.
Figure 2:
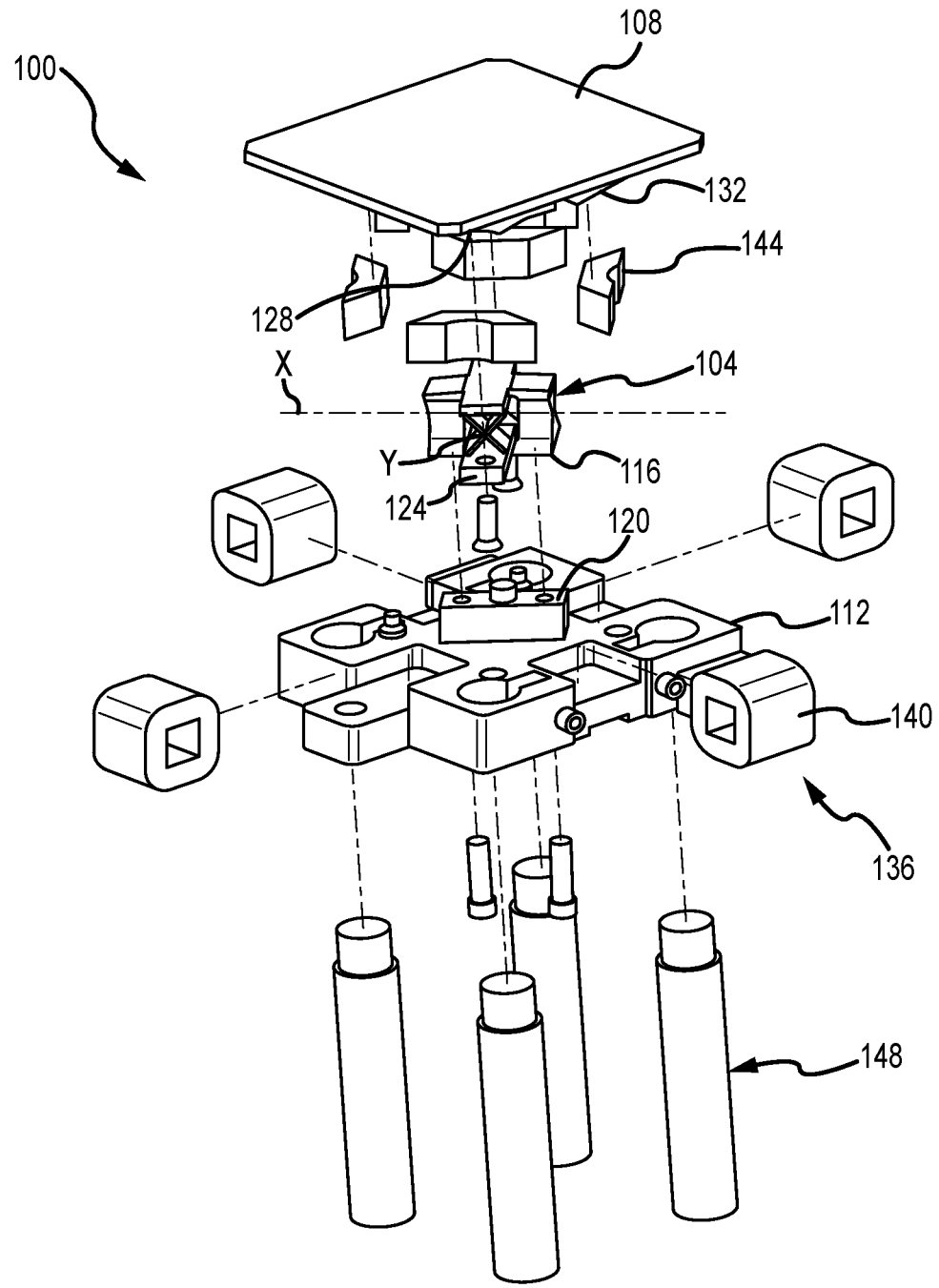
FIG. 2 is an exploded perspective view of the fast steering mirror assembly of FIG. 1.

With reference now to FIGS. 1 and 2, components of a fast steering mirror assembly 100 that includes a cross flexure suspension system 104 in accordance with embodiments of the present disclosure is depicted. More particularly, FIG. 1 is a perspective view of a fast steering mirror assembly 100 incorporating a suspension system 104 (see FIG. 2) in accordance with embodiments of the present disclosure, also referred to herein as a cross flexure suspension system 104, and FIG. 2 is a perspective view of the fast steering mirror assembly 100 of FIG. 1 in an exploded perspective view. As described herein, the cross flexure suspension system 104 joins the mirror 108 to a base 112, while permitting movement of the mirror 108 relative to the base 112 about two rotational axes X and Y. In addition, the suspension system 104 eliminates or minimizes translational movement of the mirror 108 relative to the base 112. Accordingly, the fast steering mirror assembly 100 enables tip-tilt movements of the mirror 108 to be performed relative to the base 112.

The suspension system 104 behaves like a spring, and thus returns the mirror 108 to a center or neutral position in the absence of the application of a force. In addition, the suspension system 104 can allow for relatively large angles of travel about the two rotational axes X and Y, while providing low suspension component friction to permit a high scanning frequency, and a relatively fixed point of rotation to minimize translational movement of the mirror 108. As an example, the angles of travel about each rotational axis can be plus +/−10°. In addition, the suspension system 104 can be formed as a monolithic structure, to reduce or eliminate points of failure. The suspension system 104 can also be produced as a relatively small structure.

Movement of the mirror 108 relative to the base 112 can be accomplished by incorporating actuators or motors 136 as part of the assembly 100. In accordance with embodiments of the present disclosure, the actuators 136 can be in the form of voice coil motors that each include a coil 140 and a magnet 144. In the illustrated example, the coils 140 are fixed to the base 112, while the magnets 144 are fixed to a support frame 132 on a backside of the mirror 108. The assembly 100 can additionally include position encoders 148. As shown, the position encoders 148 can comprise Differential Impedance Transducer type proximity sensors which operate in pairs to sense the angular position of the mirror. As can be appreciated by one of skill in the art after consideration of the present disclosure, other sensor systems can be incorporated as position encoders 148, such as optical encoders, laser interferometers, or the like.

Figure 3A:
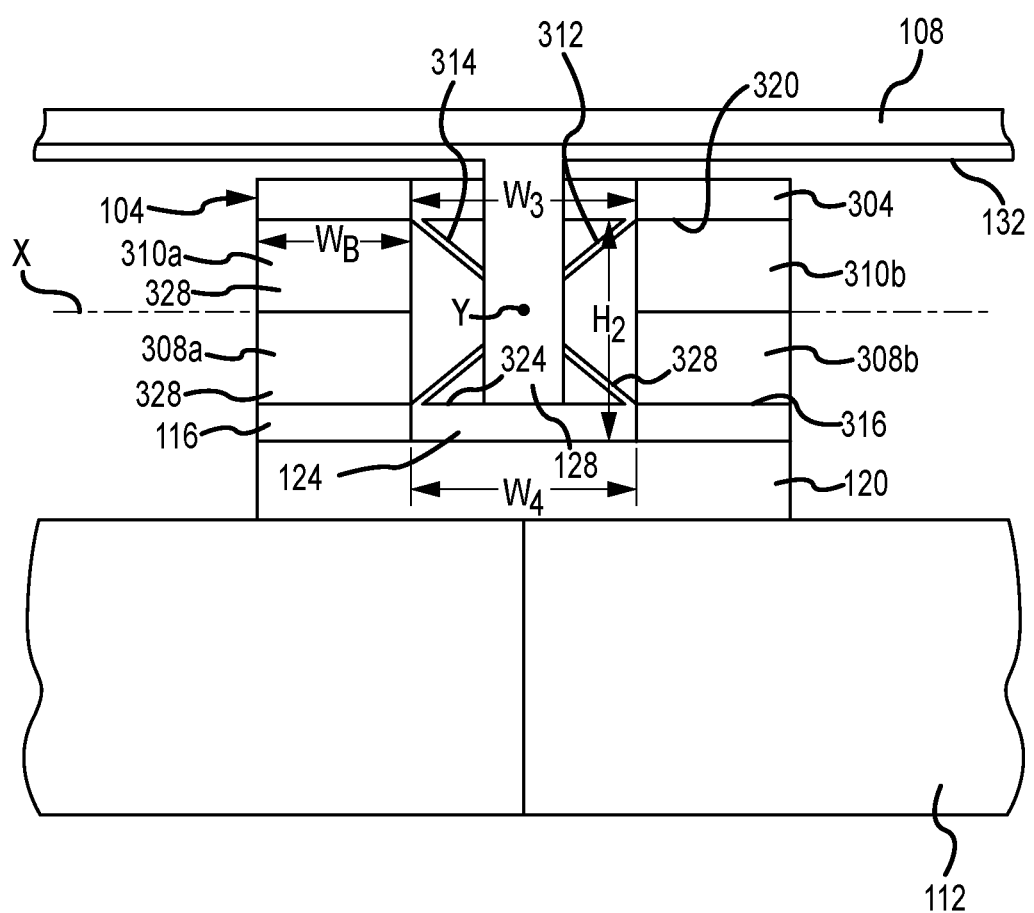
FIGS. 3A and 3B are views in elevation of a suspension system in accordance with embodiments of the present invention, taken along the Y and X axes respectively.
Figure 3B:
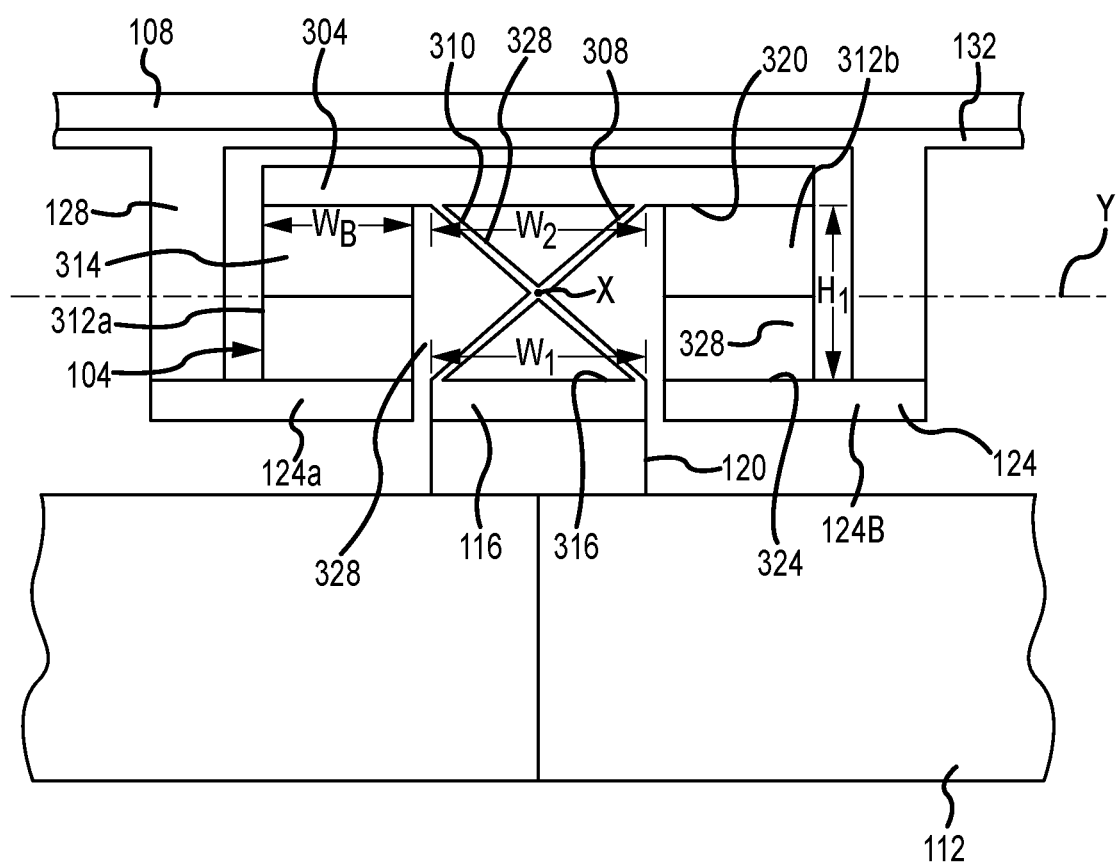

As best shown in FIGS. 3A-3B, the suspension system 104 includes a base mounting structure 116 that is fixed to a base suspension mount 120 on the base 112, and a supported element or a mirror mounting structure 124 that is fixed to a mirror suspension mount 128 on a backside of the mirror 108. The combined mirror 108 and mirror mounting structure 124 is an example of a supported structure. In accordance with embodiments of the present disclosure, the mirror suspension mount 128 may be connected to or provided as part of a mirror support frame 132. The base mounting structure 116 is joined to a connecting member or structure 304 by a first flexure structure 308 that includes at least a first set of flexure blades 310. The first flexure structure 308 allows the connecting structure 304 to move relative to the base 112 about the first or X axis of rotation. In particular, the X axis of rotation corresponds to the line along which the set or sets of flexure blades 310 of the first flexure structure 308 intersect. The connecting structure 304 is in turn joined to the mirror mounting structure 124 by a second flexure structure 312 that includes at least a first set of flexure blades 314. The second flexure structure 312 allows the mirror 108 to move relative to the connecting structure 304 about the second or Y axis of rotation. The Y axis of rotation corresponds to the line along which the set or sets of blades 314 of the second flexure structure 312 intersect. In accordance with embodiments of the present disclosure, the X and Y axes lie along a common plane. Moreover, that common plane can be parallel to a plane of the mirror 108 reflecting surface, where the mirror 108 is a flat mirror. In accordance with still other embodiments of the present disclosure, the mirror 108 may be tilted relative to the plane defined by the X and Y axes.

Figure 4:
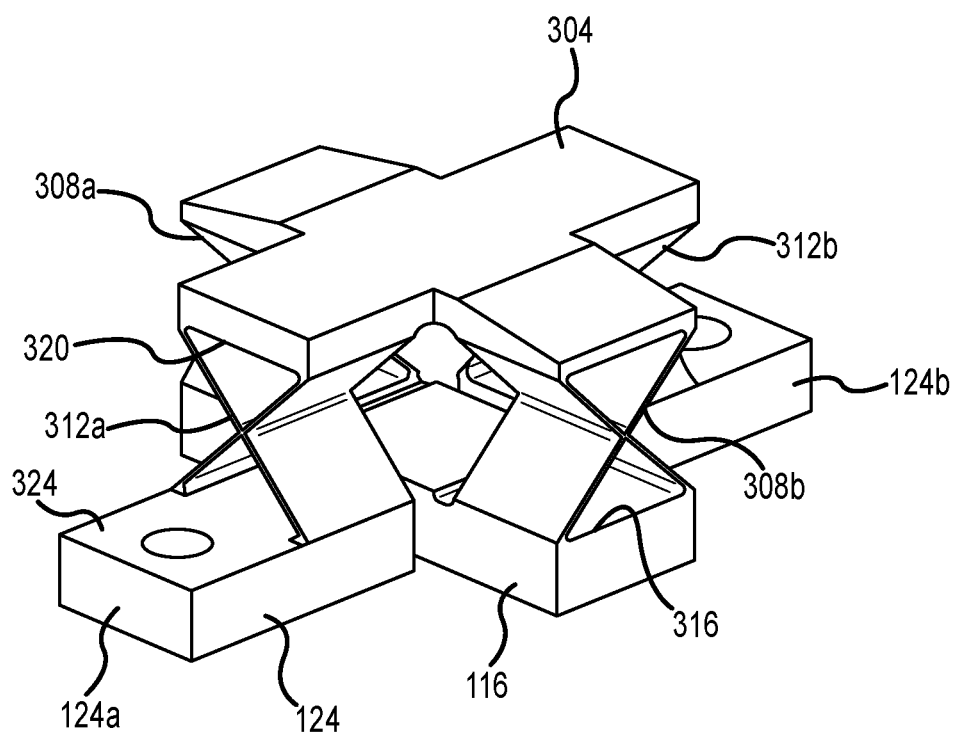
FIG. 4 is a perspective view of a suspension system in accordance with embodiments of the present disclosure.

The first flexure structure 308 can include first 308a and second 308b parts, which include a first set of flexure blades 310a and a second set of flexure blades 310b respectively, as depicted in FIG. 3A and FIG. 4. Moreover, the base mounting structure 116 can extend between the flexure blade structures 308a and 308b. As shown in FIG. 3B and FIG. 4, the second flexure structure 312 can include first 312a and second 312b parts. Moreover, it can be seen that, in this example embodiment, the mirror mounting structure 124 is provided in first 124a and second 124b parts. Accordingly, the base mounting structure 116 can remain stationary relative to the base 112, while the mirror mounting structure 124 can be rotated about the X and/or Y axes relative to the base 112. In accordance with further embodiments of the present disclosure, the suspension system 104 can be configured with a mirror mounting structure 124 that connects the second flexure structure parts 312a and 312b, and the base mounting structure 116 can be provided in two parts. In accordance with still other embodiments of the present disclosure, different numbers of blade structures 312 can be configured along the axes of rotation.

In at least some embodiments of the present disclosure, first ends of the first flexure structure parts 308a and 308b are connected to the base mounting structure 116 along lines of intersection that lie in an interior plane 316 of the base mounting structure 116. Second ends of the first flexure structure parts 308a and 308b are connected to the connecting structure 304 alone lines of intersection that lie in an interior plane 320 of the connecting structure 304. First ends of the second flexure blade structure parts 312a and 312b are connected to the connecting structure 304 along lines of intersection that lie in the interior plane 320 of the connecting structure 304. Second ends of the second flexure structure parts 312a and 312b are connected to the mirror mounting structure 124 alone lines of intersection that lie in an interior plane 324 of the mirror mounting structure 124. Moreover, individual blades 328 included in any one of the first flexure structure 308 parts intersect along a line that corresponds to the X axis, while individual blades 328 included in any one of the second flexure structure 312 parts intersect along a line that corresponds to the Y axis.

Figure 5:
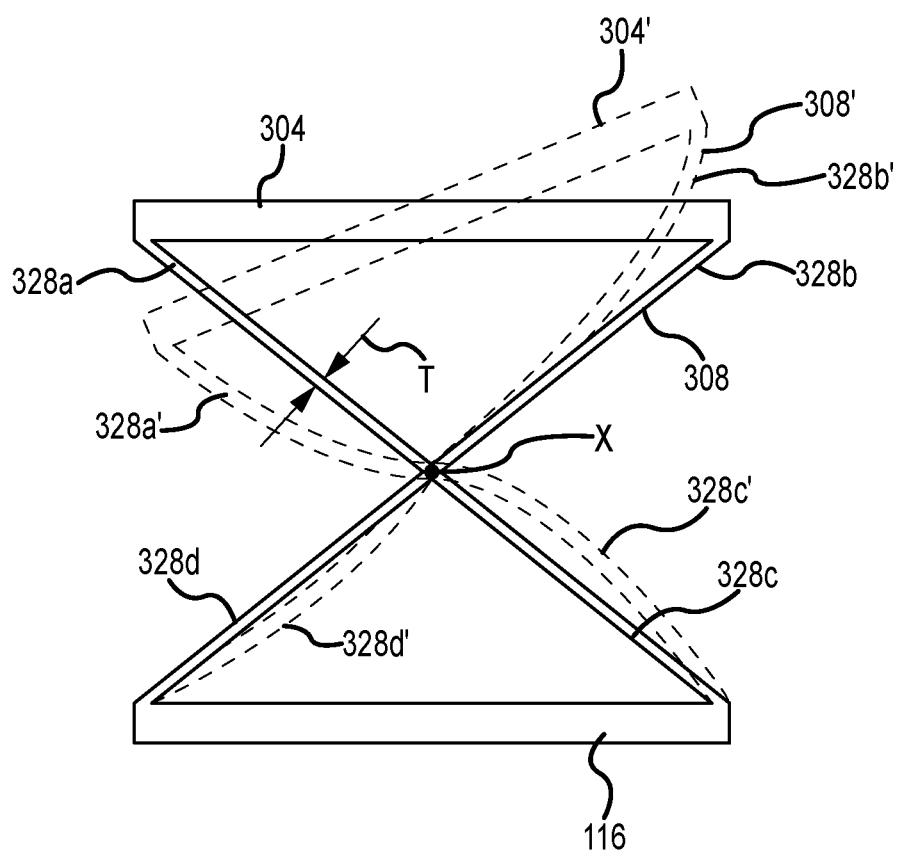
FIG. 5 depicts rotation of a flexure blade structure in accordance with embodiments of the present disclosure about a rotational axis.

With reference now to FIG. 5, a first flexure structure 308 is depicted in elevation. As shown, the flexure structure 308 generally includes four blades 328a-d. The blades intersect along a line corresponding to the X axis. Moreover, the blades 328 are relatively thin, and are formed from a common piece of material. More particularly, in FIG. 5 the first flexure structure 308 is shown in a neutral position (by solid lines), and in a rotated position (by dotted lines, and indicated by reference character 308'). In the neutral position, the connecting structure 304 is parallel to the base mounting structure 116, and to the axis of rotation X. In the illustrated rotated position, the connecting structure (labeled in the rotated position as 304') is rotated relative to the base mounting structure 116 in a plane that is orthogonal to the axis of rotation X, while both the connecting structure 304' and the base mounting structure 116 remain parallel to the X axis. As depicted in the figure, in the neutral position, the blades 328a-d are straight. In the rotated position, the blades 328 are flexed, as depicted by the dotted lines, and indicated by reference characters 328a'-d'. In addition, the axis of rotation X remains in the same position (or only very slightly shifted) relative to the base mounting structure 116. The configuration and the principal of operation are the same for the second flexure structure 312, except that the second flexure structure 312 allows the mirror mounting structure 124 to be rotated relative to the connecting structure 304 about the Y axis of rotation.

In accordance with embodiments of the present disclosure, the various components of the suspension system 104, including the base mounting structure 116, the first flexure structure or structures 308, the connecting structure 304, the second flexure structure or structures 312, and the mirror mounting structure 124, are all formed from a single piece of material. This monolithic or integral structure is advantageous in that it avoids the need for joints, and for the need to weld, braze, bond or otherwise connect individual pieces at such joints.

With reference again to FIG. 3B, a width $W_1$ of the first end of the first flexure structure 308 is defined as the distance between the lines of intersection of the blades 328 and the base mounting structure 116. A width $W_2$ of the second end of the first flexure structure 308 is defined as the distance between the lines of intersection of the blades 328 and the connecting structure 304. In accordance with embodiments of the present disclosure, the widths $W_1$ and $W_2$ of the first and second ends of the first flexure structure 308 are equal to one another. A height $H_1$ of the first flexure structure 308 is defined as the distance between the interior plane 316 of the base mounting structure 116 and the interior plane 320 of the connecting structure 304. In accordance with embodiments of the present invention, the widths $W_1$ and $W_2$ of the first and second ends of the first flexure structure 308 are equal to one another and are equal to the height H of the first flexure structure 308. Moreover, where the first flexure structure 308 is provided in more than one part, the widths and height of each of the parts can be equal to that of the other part or parts.

Similarly, as shown in FIG. 3A, a width $W_3$ of the first end of the second flexure structure 312 is defined as the distance between the lines of intersection of the blades 328 and the connecting structure 304. A width $W_4$ of the second end of the second flexure structure 312 is defined as the distance between the lines of intersection of the blades 328 and the mirror mounting structure 124. In accordance with embodiments of the present disclosure, the widths $W_3$ and $W_4$ of the first and second ends of the second flexure structure 312 are equal to one another. A height $H_2$ of the second flexure structure 308 is defined as the distance between the interior plane 320 of the connecting structure 304 and the interior plane 324 of the mirror mounting structure 124. In accordance with embodiments of the present invention, the widths $W_3$ and $W_4$ of the first and second ends of the second flexure structure 312 are equal to one another and are equal to the height $H_2$ of the second flexure structure 312. Moreover, where the second flexure structure 312 is provided in more than one part, the widths and height of each of the parts can be equal to that of the other part or parts. In accordance with further embodiments of the present disclosure, the widths and height of each part of the first flexure structure 308 are equal to the corresponding widths and height of each part of the second flexure structure 312. In general, by providing equally dimensioned first 308 and second 312 flexure structures, the resulting load capacity and resistance to rotation of the suspension system 104 is equal in all directions.

The load capacity of the suspension system 104 is influenced by the dimensions of the blades 328. In general, the blades 328 within a flexure structure 308 and 312 are planar when the suspension system 104 is in a neutral state. The blades 328 each have a width dimension $W_B$ (see FIGS. 3A and 3B) that is orthogonal to the width of the flexure structure 308 or 312 that includes the respective blade 328, and a thickness dimension T (see FIG. 5) that is orthogonal to the width dimension of the blade 328. The blades 328 each have a length that extends from a line of intersection with the other blades 328 within the respective flexure blade structure 308 or 312, and one of a base mounting structure 116, a connecting structure 304, and a mirror support structure 124. For example, by providing blades 328 that are relative thick and/or wide, the load capacity of the suspension system 104 can be increased. By providing blades 328 that are relative thin and/or narrow, the torque required to rotate the suspension system 104 about a rotational axis can be decreased. Moreover, a blade 328 with a length that is relatively short can provide a higher load capacity and require greater torque to rotate about a respective axis as compared to a blade with a length that is relatively long.

In accordance with further embodiments of the present disclosure, other flexure blade structure 308, 312 configurations are possible. For example, more than four blades 328 can be included. For instance, an additional pair of blades 328, for a total of six blades 328, extending perpendicular to the connecting structure 304 and one of the base mounting structure 116 and the mirror support structure 124 can be included. In addition, different blade 328 geometries are possible. In particular, the blades 328 need not be rectangular and flat. Examples of alternate blade 328 geometries include, but are not limited to, hourglass and barrel shapes. Moreover, alternate shapes can be incorporated into any dimension of a blade 328. In accordance with still further embodiments of the present disclosure, the blades 328 can have apertures, notches, areas of localized thinning or thickening, or the like. As can be appreciated by one of skill in the art after consideration of the present disclosure, aspects of the flexure blade structures 308, 312, and of the included blades 328, can be varied and balanced to achieve desired load capacity and bending resistance properties.

Figure 6:
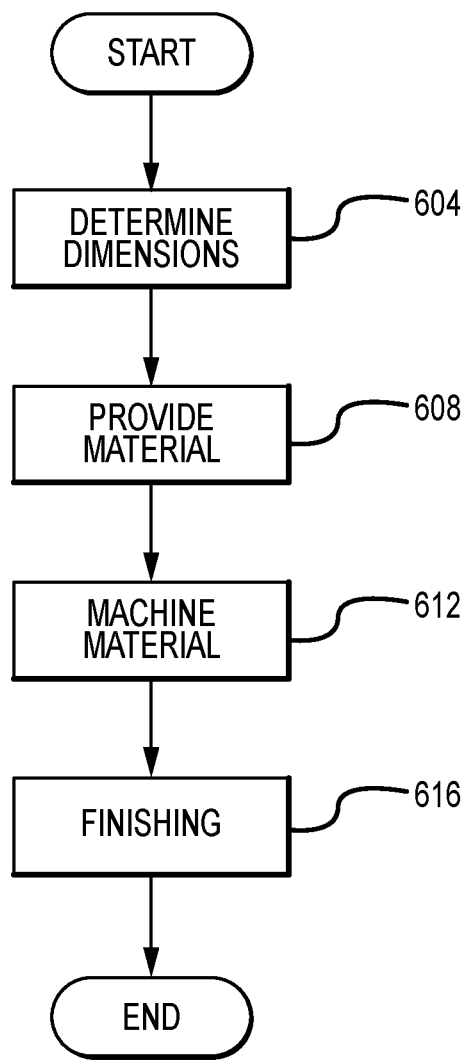
FIG. 6 is a flowchart depicting aspects of a method for providing a suspension system in accordance with embodiments of the present disclosure.

FIG. 6 is a flowchart depicting aspects of a method for providing a suspension system 104 in accordance with embodiments of the present disclosure. Initially, at step 604, the dimensions of the desired suspension system 104 are determined. This can include determining a desired load-bearing capacity and maximum angles of rotation provided by the suspension system 104. At step 608, a block of material having dimensions as large or larger than the maximum outer dimensions of the desired suspension system 104 is provided. The block of material may be selected to provide desired strength and fatigue characteristics in the completed suspension system 104. Examples of suitable materials include aluminum, steel, titanium, plastic, or the like. Next, the block of material is machined to produce the suspension system 104, including a base mounting structure 116, a first flexure structure 308, a connecting structure 304, a second flexure structure 312, and a supported element structure 124 (step 612). As can be appreciated by one of skill in the art after consideration of the present disclosure, machining can include drilling, sawing, etching or other operations. As a particular example, such operations can include wire electrical discharge machining (EDM). At step 616, an optional finishing step of surface finishing, such as acid etching, anodizing, or plating can be performed. Accordingly, a monolithic or unitary structure, in which the various components of a suspension system 104, including a base mounting structure 116, a first flexure structure 308, a connecting structure 304, a second flexure structure 312, and a mirror mounting structure 124, are formed from a single block of material, is provided. By thus eliminating separate components within the suspension system 104, individual joints, which are potential points of failure, are reduced or eliminated. Moreover, the need to join individual components within the suspension structure 104 is eliminated. In addition, manufacturing inconsistencies can be reduced or eliminated.

Although various examples of a suspension system 104 used in combination with a mirror 108, such as a fast steering mirror, have been described, embodiments of the present disclosure are not so limited. For example, a suspension system 104 in accordance with embodiments of the present disclosure can be used as a support for any object, structure or component in which it is desirable to provide two degrees of freedom of movement about (or nearly about) a fixed point between a base structure and a supported structure. Moreover, a suspension system 104 in accordance with embodiments of the present disclosure can be used in applications where a relatively high frequency of oscillation or change in angle is required or desirable. The suspension system 104 can also provide a self-centering force, that tends to bring the supported structure back to a neutral position relative to the base mounting structure.

Embodiments of the present disclosure provide a suspension system that allows larger angular travel (more than +/−10 deg.) that previous systems, with minimum pivot point translation or decenter, enabling a robust implementation of a motion control system. In addition, embodiments of the present disclosure allow handling of higher dynamic loads than previous designs. The suspension system disclosed herein can be more compact than prior systems, allowing implementation in smaller devices. In accordance with at least some embodiments, the monolithic flexure is made by an Electrical Discharge Machining (EDM) allowing manufacturing of thin flexure blades eliminating the need for welded or brazed joints.

Advantages of embodiments of the present disclosure compared to previous designs include: 1) enables large angular displacements of more than +/−10 degrees, 2) minimizes pivot point translation or decenter, enabling robust implementation of motion control system; 3) provides higher load carrying capability; and 4) utilizes monolithic construction, eliminating the need for welded or brazed joints.

Exemplary embodiments of the present disclose can be configured in various ways, including as follows:

(1) A suspension system, comprising:
a base mounting structure;
a connecting structure;
a supported element structure;
a first flexure structure including a first set of flexure blades, wherein the blades in the first set of flexure blades intersect along a first axis of rotation, wherein a first end of the first flexure structure is fixed to the base mounting structure, wherein a second end of the first flexure structure is fixed to the connecting structure, and wherein the first flexure structure allows the connecting structure to rotate relative to the base mounting structure about the first axis of rotation;
a second flexure structure including a second set of flexure blades, wherein the blades of the second flexure structure intersect along a second axis of rotation, wherein a first end of the second flexure structure is fixed to the connecting member, wherein a second end of the second flexure structure is fixed to the supported element structure, and wherein the second flexure structure allows the supported element structure to rotate relative to the base mounting structure about the second axis of rotation.

(2) The system of (1), wherein the suspension system is a monolithic structure.

(3) The system of (1) or (2), wherein the first set of flexure blades includes four blades that intersect along the first axis of rotation, and wherein the second set of flexure blades includes four blades that intersect along the second axis of rotation.

(4) The system of any of (1) to (3), wherein the first axis of rotation is perpendicular to the second axis of rotation.

(5) The system of any of (1) to (4), wherein the first and second axes of rotation are in a first plane.

(6) The system of any of (1) to (5), wherein the first flexure structure further includes a third set of flexure blades, wherein the blades in the third set of flexure blades intersect along the first axis of rotation.

(7) The system of any of (1) to (6), wherein the second flexure structure further includes a fourth set of flexure blades, wherein the blades in the fourth set of flexure blades intersect along the second axis of rotation.

(8) The system of any of (1) to (7), wherein lines of attachment between the blades of the first flexure structure and the base mounting structure are within a first plane, wherein lines of attachment between the blades of the first flexure structure and the connecting structure are within a second plane, and wherein the first plane is parallel to the second plane.

(9) The system of (8), wherein lines of attachment between the blades of the second flexure structure and the connecting member are within the second plane, and wherein lines of attachment between the blades of the second flexure structure and the supported element structure are within the first plane.

(10) The system of (8) or (9), wherein the first and second planes are parallel to one another when the flexure structures are in a neutral state.

(11) A system, comprising:
a suspension system, the suspension system including:
a base mounting structure;
a connecting structure;
a supported element structure;
a first flexure structure, wherein the first flexure structure allows the connecting member to rotate relative to the base mounting structure about a first axis of rotation;
a second flexure structure, wherein the second flexure structure allows the supported element structure to rotate relative to the base mounting structure about a second axis of rotation; and
at least a first position sensor, wherein the first position sensor is operable to detect a change in a distance between the base mounting structure and the supported element structure as a result of rotation of the supported element structure relative to the base mounting structure about at least one of the first and second axes of rotation.

(12) The system of (11), further comprising:
at least a first actuator, wherein the first actuator is operable to move the supported element structure relative to the base mounting structure about at least a first one of the first and second axes of rotation.

(13) The system of (12), further comprising:
a second actuator, wherein the second actuator is operable to move the supported element structure relative to the base mounting structure in at least of second one of the first and second axes of rotation.

(14) The system of any of (11) to (13), further comprising:
a second position sensor, wherein the first position sensor is operable to detect a change in a distance between the base mounting structure and the supported element structure as a result of rotation of the supported element structure relative to the base mounting structure about the first axis of rotation, wherein the second position sensor is operable to detect a change in a distance between the base mounting structure and the supported element structure as a result of rotation of the supported element structure relative to the base mounting structure about the second axis of rotation.

(15) The system of any of (11) to (14), wherein the first and second axes of rotation lie in a first plane.

(16) The system of any of (11) to (15), wherein an interior plane of the base mounting structure is coincident with an interior plane of the supported member, wherein a first end of the first flexure structure is joined to the base mounting structure along lines of intersection that lie within the interior plane of the base mounting structure;

wherein a second end of the first flexure structure is joined to the connecting structure along lines of intersection that lie within an interior plane of the connecting structure, wherein a first end of the second flexure structure is joined to the connecting structure along lines of intersection that line within the interior plane of the connecting structure, and wherein a second end of the second flexure structure is joined to the supported element structure along lines of intersection that lie within the interior plane of the supported element structure.

(17) The system of any of (11) to (16), wherein the first and second axes of rotation are orthogonal to one another.

(18) The system of any of (11) to (17), wherein the first and second axes of rotation define a plane that is parallel to the interior planes of the base mounting structure, the connecting structure, and the supported element structure.

(19) The system of any of (11) to (18), further comprising a mirror, wherein the mirror is fixed to the supported element structure.

(20) A method for providing a suspension system, comprising:

providing a single block of material;
machining components from the single block of material, wherein the components include:
 a base mounting structure;
 a connecting structure;
 a supported element structure;
 a first flexure structure, wherein the first flexure structure allows the connecting member to rotate relative to the base mounting structure about a first axis of rotation; and
 a second flexure structure, wherein the second flexure structure allows the supported element structure to rotate relative to the base mounting structure about a second axis of rotation, wherein the components of the suspension system are integral to one another.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A system for supporting an object, comprising:
 a suspension system, the suspension system including:
  a base mounting structure;
  a connecting structure;
  a supported element structure;
  a first flexure structure, wherein the first flexure structure joins the base mounting structure to the connecting structure and allows the connecting structure to rotate relative to the base mounting structure about a first axis of rotation;
  a second flexure structure, wherein the second flexure structure joins the supported element structure to the connecting structure and allows the supported element structure to rotate relative to the base mounting structure about a second axis of rotation;
 at least a first position sensor, wherein the first position sensor is fixed relative to the base mounting structure, and wherein the first position sensor is operable to detect a change in a distance between the base mounting structure and the supported element structure as a result of rotation of the supported element structure relative to the base mounting structure about at least one of the first and second axes of rotation;
 a first actuator, wherein the first actuator includes a first component that is fixed relative to the base mounting structure and a second component that is fixed relative to the supported element structure, and wherein the first actuator is operable to move the supported element structure relative to the base mounting structure about at least a first one of the first and second axes of rotation; and
 a second actuator, wherein the second actuator includes a first component that is fixed relative to the base mounting structure and a second component that is fixed relative to the supported element structure, and wherein the second actuator is operable to move the supported element structure relative to the base mounting structure about at least a second one of the first and second axes of rotation.

2. The system of claim 1, further comprising:
 a second position sensor, wherein the second position sensor is fixed relative to the base mounting structure, wherein the first position sensor is operable to detect a change in a distance between the base mounting structure and the supported element structure as a result of rotation of the supported element structure relative to the base mounting structure about the first axis of rotation, and wherein the second position sensor is operable to detect a change in a distance between the base mounting structure and the supported element structure as a result of rotation of the supported element structure relative to the base mounting structure about the second axis of rotation.

3. The system of claim 1, wherein the first and second axes of rotation lie in a first plane.

4. The system of claim 1, wherein the suspension system is a monolithic structure.

5. The system of claim 4, wherein the first flexure structure includes four blades that intersect along the first axis of rotation, and wherein the second flexure structure includes four blades that intersect along the second axis of rotation.

6. The system of claim 5, wherein the first axis of rotation is perpendicular to the second axis of rotation.

7. The system of claim 6, wherein the first and second axes of rotation lie in a first plane.

8. A system for supporting an object, comprising:
a suspension system, the suspension system including:
- a base mounting structure;
- a connecting structure;
- a supported element structure;
- a first flexure structure, wherein the first flexure structure joins the base mounting structure to the connecting structure and allows the connecting structure to rotate relative to the base mounting structure about a first axis of rotation;
- a second flexure structure, wherein the second flexure structure joins the supported element structure to the connecting structure and allows the supported element structure to rotate relative to the base mounting structure about a second axis of rotation; and at least a first position sensor, wherein the first position sensor is fixed relative to the base mounting structure, wherein the first position sensor is operable to detect a change in a distance between the base mounting structure and the supported element structure as a result of rotation of the supported element structure relative to the base mounting structure about at least one of the first and second axes of rotation, wherein the first and second axes of rotation lie in a first plane, wherein an interior plane of the base mounting structure is coincident with an interior plane of the supported element structure, wherein a first end of the first flexure structure is joined to the base mounting structure along lines of intersection that lie within the interior plane of the base mounting structure;

wherein a second end of the first flexure structure is joined to the connecting structure along lines of intersection that lie within an interior plane of the connecting structure, wherein a first end of the second flexure structure is joined to the connecting structure along lines of intersection that lie within the interior plane of the connecting structure, and wherein a second end of the second flexure structure is joined to the supported element structure along lines of intersection that lie within the interior plane of the supported element structure.

9. The system of claim 8, further comprising:
at least a first actuator, wherein the first actuator includes at least a first component that is fixed relative to the base mounting structure, and wherein the first actuator is operable to move the supported element structure relative to the base mounting structure about at least a first one of the first and second axes of rotation.

10. The system of claim 8, wherein the first and second axes of rotation are orthogonal to one another.

11. The system of claim 10, wherein, in at least a neutral position, the first and second axes of rotation define a plane that is parallel to the interior planes of the base mounting structure, the connecting structure, and the supported element structure.

12. The system of claim 11, further comprising a mirror, wherein the mirror is fixed to the supported element structure.

13. The system of claim 1, wherein the first flexure structure includes first and second sets of flexure blades, wherein the blades in the first set of flexure blades intersect along the first axis of rotation, and wherein the blades in the second set of flexure blades intersect along the first axis of rotation.

14. The system of claim 13, wherein the second flexure structure includes third and fourth sets of flexure blades, wherein the blades in the third set of flexure blades intersect along the second axis of rotation, and wherein the blades in the fourth set of flexure blades intersect along the second axis of rotation.

15. The system of claim 14, wherein the suspension system is a monolithic structure.

16. The system of claim 15, wherein the first flexure structure includes four blades that intersect along the first axis of rotation, and wherein the second flexure structure includes four blades that intersect along the second axis of rotation.

17. The system of claim 16, wherein the first axis of rotation is perpendicular to the second axis of rotation.

18. The system of claim 17, wherein the first and second axes of rotation lie in a first plane.

19. The system of claim 8, wherein the first flexure structure includes first and second sets of flexure blades, wherein the blades in the first set of flexure blades intersect along the first axis of rotation, and wherein the blades in the second set of flexure blades intersect along the first axis of rotation.

20. The system of claim 19, wherein the second flexure structure includes third and fourth sets of flexure blades, wherein the blades in the third set of flexure blades intersect along the second axis of rotation, and wherein the blades in the fourth set of flexure blades intersect along the second axis of rotation.

* * * * *